(12) United States Patent
Korney, Jr.

(10) Patent No.: US 6,685,858 B2
(45) Date of Patent: *Feb. 3, 2004

(54) IN-LINE COMPOUNDING AND EXTRUSION SYSTEM

(75) Inventor: Arthur F. Korney, Jr., Pickerington, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/254,117

(22) Filed: Sep. 25, 2002

(65) Prior Publication Data

US 2003/0025233 A1 Feb. 6, 2003

Related U.S. Application Data

(63) Continuation of application No. 08/924,191, filed on Sep. 5, 1997, now Pat. No. 6,464,913.

(51) Int. Cl.[7] .............................................. B29C 47/00
(52) U.S. Cl. .............. 264/102; 264/211.21; 264/211.23
(58) Field of Search ................................ 264/102, 126, 264/176.1, 211.12, 211.13, 211.21, 211.23

(56) References Cited

U.S. PATENT DOCUMENTS

| | | | |
|---|---|---|---|
| 1,156,096 A | * 10/1915 | Price | 425/380 |
| 2,188,396 A | 1/1940 | Semon | 18/55 |
| 2,489,373 A | 11/1949 | Gilman | 260/37 |
| 2,519,442 A | 8/1950 | Delorme et al. | 260/37 |
| 2,558,378 A | 6/1951 | Petry | 260/41 |
| 2,635,976 A | 4/1953 | Meiler et al. | 154/132 |
| 2,680,102 A | 6/1954 | Becher | 260/17.3 |
| 2,789,903 A | 4/1957 | Lukman et al. | 92/21 |
| 2,935,763 A | 5/1960 | Newman et al. | 18/55 |
| 3,287,480 A | 11/1966 | Wechsler et al. | 264/122 |
| 3,308,218 A | 3/1967 | Etal | 264/121 |
| 3,309,444 A | 3/1967 | Schueler | 264/109 |
| 3,492,388 A | 1/1970 | Inglin-Knüsel | 264/129 |
| 3,493,527 A | 2/1970 | Schueler | 260/17.2 |
| 3,562,373 A | 2/1971 | Logrippo | 264/118 |
| 3,645,939 A | 2/1972 | Gaylord | 260/17.4 GC |
| 3,671,615 A | 6/1972 | Price | 264/39 |
| 3,864,201 A | 2/1975 | Susuki et al. | 161/160 |
| 3,867,493 A | 2/1975 | Seki | 264/45.9 |
| 3,878,143 A | 4/1975 | Baumann et al. | 260/17.4 R |
| 3,879,505 A | 4/1975 | Boutillier et al. | 264/48 |
| 3,888,810 A | 6/1975 | Shinomura | 260/17.4 BB |
| 3,899,559 A | 8/1975 | Johanson et al. | 264/115 |
| 3,917,507 A | * 11/1975 | Skidmore | 159/2.2 |
| 3,922,328 A | 11/1975 | Johnson | 264/46.1 |
| 3,931,384 A | 1/1976 | Forquer et al. | 264/120 |
| 3,943,079 A | 3/1976 | Hamed | 260/17.4 BB |
| 3,954,555 A | 5/1976 | Kole et al. | 162/136 |
| 3,956,541 A | 5/1976 | Pringle | 428/2 |
| 3,956,555 A | 5/1976 | McKean | 428/106 |
| 3,969,459 A | 7/1976 | Fremont et al. | 264/109 |

(List continued on next page.)

Primary Examiner—Mark Eashoo
(74) Attorney, Agent, or Firm—Standley & Gilcrest

(57) ABSTRACT

The present invention is a continuous in-line compounding and extrusion system that does not require pre-dried wood flour or pelletized feed stock of cellulosic/polymer composite materials in order to produce net shapes from cellulosic/polymer composite materials. An exemplary embodiment of the present invention utilizes automated loss-in-weight feeders to dispense wood flour and all of the other cellulosic/polymer composite materials into a compounder. The compounder blends the cellulosic/polymer composite materials into a composite melt. The composite melt is continuously devolitalized as it travels through the compounder, a transition chute, and a finish extruder. The composite melt is then forced through a profile die which is fitted to the finish extruder in order to achieve a net shape.

20 Claims, 2 Drawing Sheets

U.S. PATENT DOCUMENTS

| | | | |
|---|---|---|---|
| 4,005,162 A | 1/1977 | Bucking | 264/25 |
| 4,012,348 A | 3/1977 | Chelland et al. | 260/28.5 R |
| 4,016,232 A | 4/1977 | Pringle | 264/112 |
| 4,016,233 A | 4/1977 | Pringle | 264/122 |
| 4,018,722 A | 4/1977 | Baker | 260/2.3 |
| 4,029,831 A | 6/1977 | Daunheimer | 427/264 |
| 4,045,603 A | 8/1977 | Smith | 428/2 |
| 4,056,591 A | 11/1977 | Goettler et al. | 264/108 |
| 4,058,580 A | 11/1977 | Flanders | 264/113 |
| 4,071,479 A | 1/1978 | Broyde et al. | 260/2.3 |
| 4,071,494 A | 1/1978 | Gaylord | 260/42.14 |
| 4,097,648 A | 6/1978 | Pringle | 428/326 |
| 4,102,106 A | 7/1978 | Golder et al. | 52/533 |
| 4,107,110 A | 8/1978 | Lachowicz et al. | 260/17.4 CL |
| 4,115,497 A | 9/1978 | Halmø et al. | 264/115 |
| 4,145,389 A | 3/1979 | Smith | 264/40.7 |
| 4,157,415 A | 6/1979 | Lindenberg | 428/284 |
| 4,168,251 A | 9/1979 | Schinzel et al. | 260/17.4 R |
| 4,178,411 A | 12/1979 | Cole et al. | 428/310 |
| 4,181,764 A | 1/1980 | Totten | 428/155 |
| 4,187,352 A | 2/1980 | Klobbie | 521/79 |
| 4,191,798 A | 3/1980 | Schumacher et al. | 428/95 |
| 4,203,876 A | 5/1980 | Dereppe et al. | 260/17.4 R |
| 4,228,116 A | 10/1980 | Colombo et al. | 264/119 |
| 4,239,679 A | 12/1980 | Rolls et al. | 260/42.49 |
| 4,241,133 A | 12/1980 | Lund et al. | 428/326 |
| 4,244,903 A | 1/1981 | Schnause | 264/68 |
| 4,248,743 A | 2/1981 | Goettler | 260/17.4 BB |
| 4,248,820 A | 2/1981 | Haataja | 264/113 |
| 4,250,222 A | 2/1981 | Mavel et al. | 428/285 |
| 4,263,184 A | 4/1981 | Leo et al. | 260/17.4 CL |
| 4,263,196 A | 4/1981 | Schumacher et al. | 260/33.6 |
| 4,272,577 A | 6/1981 | Lyng | 428/112 |
| 4,273,688 A | 6/1981 | Porzel et al. | 260/17.4 R |
| 4,277,428 A | 7/1981 | Luck et al. | 264/118 |
| 4,290,988 A | 9/1981 | Nopper et al. | 264/112 |
| 4,292,359 A * | 9/1981 | Mosso | 428/151 |
| 4,303,019 A | 12/1981 | Haataja et al. | 108/51.1 |
| 4,305,901 A | 12/1981 | Prince et al. | 264/176 R |
| 4,317,765 A | 3/1982 | Gaylord | 523/204 |
| 4,323,625 A | 4/1982 | Coran et al. | 428/361 |
| 4,376,144 A | 3/1983 | Goettler | 428/36 |
| 4,382,108 A | 5/1983 | Carroll et al. | 428/326 |
| 4,382,758 A | 5/1983 | Nopper et al. | 425/82.1 |
| 4,393,020 A | 7/1983 | Li et al. | 264/108 |
| 4,414,267 A | 11/1983 | Coran et al. | 428/288 |
| 4,420,351 A | 12/1983 | Lussi et al. | 156/62.4 |
| 4,430,468 A | 2/1984 | Schumacher | 524/109 |
| 4,440,708 A | 4/1984 | Haataja et al. | 264/109 |
| 4,480,061 A | 10/1984 | Coughlin et al. | 524/13 |
| 4,481,701 A | 11/1984 | Hewitt | 29/416 |
| 4,491,553 A | 1/1985 | Yamada et al. | 264/51 |
| 4,503,115 A | 3/1985 | Hemels et al. | 428/281 |
| 4,505,869 A | 3/1985 | Nishibori | 264/115 |
| 4,506,037 A | 3/1985 | Suzuki et al. | 521/82 |
| 4,508,595 A | 4/1985 | Gåsland | 162/158 |
| 4,562,218 A | 12/1985 | Fornadel et al. | 524/15 |
| 4,594,372 A | 6/1986 | Natov et al. | 523/208 |
| 4,597,928 A | 7/1986 | Terentiev et al. | 264/87 |
| 4,610,900 A | 9/1986 | Nishibori | 428/15 |
| 4,632,795 A * | 12/1986 | Huber et al. | 264/115 |
| 4,645,631 A | 2/1987 | Hegenstaller et al. | 264/69 |
| 4,659,754 A | 4/1987 | Edwards et al. | 523/214 |
| 4,663,225 A | 5/1987 | Farley et al. | 428/290 |
| 4,687,793 A | 8/1987 | Motegi et al. | 523/200 |
| 4,717,742 A | 1/1988 | Beshay | 523/203 |
| 4,734,236 A | 3/1988 | Davis | 264/112 |
| 4,737,532 A | 4/1988 | Fujita et al. | 524/13 |
| 4,746,688 A | 5/1988 | Bistak et al. | 523/220 |
| 4,769,109 A | 9/1988 | Tellvik et al. | 162/123 |
| 4,769,274 A | 9/1988 | Tellvik et al. | 428/218 |
| 4,783,493 A | 11/1988 | Motegi et al. | 524/13 |
| 4,789,604 A | 12/1988 | van der Hoeven | 428/503 |
| 4,790,966 A | 12/1988 | Sandberg et al. | 264/39 |
| 4,791,020 A | 12/1988 | Kokta | 428/326 |
| 4,801,495 A | 1/1989 | van der Hoeven | 428/286 |
| 4,818,604 A | 4/1989 | Tock | 428/319.9 |
| 4,820,749 A | 4/1989 | Beshay | 523/203 |
| 4,851,458 A | 7/1989 | Hopperdietzel | 523/205 |
| 4,865,788 A | 9/1989 | Davis | 264/112 |
| 4,889,673 A | 12/1989 | Takimoto | 264/118 |
| 4,894,192 A | 1/1990 | Warych | 264/68 |
| 4,902,455 A * | 2/1990 | Wobbe | 264/40.7 |
| 4,915,764 A | 4/1990 | Miani | 156/244.19 |
| 4,927,572 A | 5/1990 | van der Hoeven | 264/22 |
| 4,927,579 A | 5/1990 | Moore | 264/101 |
| 4,935,182 A | 6/1990 | Ehner et al. | 264/112 |
| 4,960,548 A | 10/1990 | Ikeda et al. | 264/40.4 |
| 4,968,463 A | 11/1990 | Levasseur | 264/40.1 |
| 4,973,440 A | 11/1990 | Tamura et al. | 264/114 |
| 4,978,489 A | 12/1990 | Radvan et al. | 264/118 |
| 4,988,478 A | 1/1991 | Held | 264/518 |
| 5,002,713 A | 3/1991 | Palardy et al. | 264/109 |
| 5,008,310 A | 4/1991 | Beshay | 524/13 |
| 5,009,586 A | 4/1991 | Pallmann | 425/311 |
| 5,049,334 A | 9/1991 | Bach | 264/122 |
| 5,057,167 A | 10/1991 | Gersbeck | 156/62.2 |
| 5,064,592 A | 11/1991 | Ueda et al. | 264/112 |
| 5,075,057 A | 12/1991 | Hoedl | 264/115 |
| 5,075,359 A | 12/1991 | Castagna et al. | 524/13 |
| 5,078,937 A | 1/1992 | Eela | 264/109 |
| 5,082,605 A | 1/1992 | Brooks et al. | 264/40.6 |
| 5,087,400 A | 2/1992 | Theuveny | 264/115 |
| 5,088,910 A | 2/1992 | Goforth et al. | 425/142 |
| 5,096,046 A | 3/1992 | Goforth et al. | 198/604 |
| 5,096,406 A | 3/1992 | Brooks et al. | 425/205 |
| 5,120,776 A | 6/1992 | Raj et al. | 524/13 |
| 5,126,088 A * | 6/1992 | Andres | 264/173.17 |
| 5,153,241 A | 10/1992 | Beshay | 524/8 |
| 5,194,461 A | 3/1993 | Bergquist et al. | 524/13 |
| 5,219,634 A | 6/1993 | Aufderhaar | 428/156 |
| 5,272,000 A | 12/1993 | Chenoweth et al. | 428/283 |
| 5,276,082 A | 1/1994 | Forry et al. | 524/504 |
| 5,288,772 A | 2/1994 | Hon | 524/35 |
| 5,302,634 A | 4/1994 | Mushovic | 523/219 |
| 5,369,147 A | 11/1994 | Mushovic | 523/219 |
| 5,393,536 A | 2/1995 | Brandt et al. | 425/112 |
| 5,406,768 A | 4/1995 | Giuseppe et al. | 52/730.4 |
| 5,422,170 A | 6/1995 | Iwata et al. | 428/218 |
| 5,435,954 A | 7/1995 | Wold | 264/115 |
| 5,437,826 A * | 8/1995 | Martinello et al. | 264/102 |
| 5,441,801 A | 8/1995 | Deaner et al. | 428/326 |
| 5,458,834 A | 10/1995 | Faber et al. | 264/109 |
| 5,474,722 A * | 12/1995 | Woodhams | 264/45.3 |
| 5,480,602 A | 1/1996 | Nagaich | 264/122 |
| 5,486,553 A | 1/1996 | Deaner et al. | 524/13 |
| 5,497,594 A | 3/1996 | Giuseppe et al. | 52/730.4 |
| 5,516,472 A | 5/1996 | Laver | 264/118 |
| 5,518,677 A * | 5/1996 | Deaner et al. | 264/142 |
| 5,532,065 A | 7/1996 | Gübitz | 428/480 |
| 5,537,789 A | 7/1996 | Minke et al. | 52/313 |
| 5,539,027 A * | 7/1996 | Deaner et al. | 524/13 |
| 5,576,374 A | 11/1996 | Betso et al. | 524/451 |
| 5,585,155 A | 12/1996 | Heikkila et al. | 428/36 |
| 5,589,203 A * | 12/1996 | Sato | 425/147 |
| 5,593,625 A | 1/1997 | Riebel et al. | 264/115 |
| 5,695,874 A | 12/1997 | Deaner et al. | 428/326 |
| 5,773,138 A | 6/1998 | Seethamraju et al. | 428/326 |
| 5,783,125 A | 7/1998 | Bastone et al. | 264/45.3 |
| 5,827,462 A | 10/1998 | Brandt et al. | 264/179 |
| 5,827,607 A | 10/1998 | Deaner et al. | 428/326 |

| | | | | | | |
|---|---|---|---|---|---|---|
| 5,836,128 A | 11/1998 | Groh et al. ............... 52/580 | | 6,117,924 A | 9/2000 | Brandt .................... 524/13 |
| 5,866,264 A | 2/1999 | Zehner et al. ........... 428/481 | | 6,122,877 A | 9/2000 | Hendrickson et al. ..... 52/520 |
| 5,882,564 A | 3/1999 | Puppin ............. 264/177.16 | | 6,180,257 B1 | 1/2001 | Brandt et al. ........... 428/532 |
| 5,948,505 A | 9/1999 | Puppin .................. 428/121 | | 6,344,504 B1 | 2/2002 | Zehner et al. ............ 524/14 |
| 5,948,524 A | 9/1999 | Seethamraju et al. .... 428/326 | | 6,357,197 B1 | 3/2002 | Serino et al. .......... 52/738.1 |
| 5,985,429 A | 11/1999 | Plummer et al. ........ 428/220 | | 6,358,585 B1 | 3/2002 | Wolff .................... 428/36.6 |
| 6,007,656 A | 12/1999 | Heikkila et al. .......... 156/180 | | 6,464,913 B1 * | 10/2002 | Korney, Jr. ............. 264/102 |
| 6,011,091 A | 1/2000 | Zehner .................... 524/13 | | | | |
| 6,106,944 A | 8/2000 | Heikkila et al. .......... 428/397 | | * cited by examiner | | |

IN-LINE COMPOUNDING AND EXTRUSION SYSTEM

This is a continuation of U.S. application Ser. No. 08/924,191, filed Sep. 5, 1997 now U.S. Pat. No. 6,464,913.

BACKGROUND AND SUMMARY OF THE INVENTION

The present invention relates generally to a continuous in-line compounding and extrusion system, and more particularly to, a continuous in-line compounding and extrusion system that produces net shapes. The present invention is useful for several different formulations and material composites including, but not limited to, polyvinyl chloride (PVC) formulations, polyethylene (HDPE) formulations, and cellulosic/polymer composites. The present invention will be described primarily with reference to cellulosic/polymer composites, but it is also intended for use with other material composites and formulations.

Cellulosic/polymer composites are used as replacements for all-natural wood, particle board, wafer board, and other similar materials. In recent years, a tremendous demand has developed for cellulosic/polymer composites that exhibit the look and feel of natural woods. Unfortunately, the supply of natural woods for construction and other purposes is dwindling. Consequently, many are concerned about conserving the world's forests, and the cost of natural woods has risen.

The demand for cellulosic/polymer composites has also increased for other reasons. As compared to natural woods, cellulosic/polymer composites offer superior resistance to wear and tear. In particular, cellulosic/polymer composites have enhanced resistance to moisture. In fact, it is well known that the retention of moisture is a primary cause of the warping, splintering, and discoloration of natural woods. Moreover, cellulosic/polymer composites may be sawed, sanded, shaped, turned, fastened, and finished in the same manner as natural woods. Therefore, cellulosic/polymer composites are commonly used for applications such as interior and exterior decorative house moldings, picture frames, furniture, porch decks, window moldings, window components, door components, and roofing structures.

Traditionally, two types of processes have been employed to manufacture cellulosic/polymer composites. The first type of process manufactures the cellulosic/polymer composite materials into pelletized feed stock that is later, at another site, fed into a single or twin-screw extruder. The output of the extruder is then sent through a profile die to obtain a net shape. However, this type of manufacturing process has drawbacks because it requires an independent mixing and storage system to compound, pelletize, cool, package, and store feed stock of the cellulosic/polymer composite materials.

The second type of manufacturing process eliminates the need to pelletize, cool, package, and store feed stock of the cellulosic/polymer composite materials. Instead, the second type of manufacturing process blends the polymer materials into a homogeneous mixture. The homogeneous mixture is delivered to a site where it is then combined with pre-dried wood flour. The resulting composition is fed through a twin-screw extruder which converts the composition into a fused melt. The fused melt is then pumped through a profile die to achieve a net shape.

Conventional use of a twin-screw extruder, however, is not an efficient means to maintain a relatively dry mixture. Moreover, when employing the second type of manufacturing process, precise guidelines must be adhered to in order to achieve the superior qualities of cellulosic/polymer composites. Most importantly, the wood flour that constitutes the cellulosic material must be dried before it is extruded. As is well known in the art, failure to dry the wood flour before it is extruded will commonly result in a fragile composite that is susceptible to cracking, blistering, and deteriorating appearance.

Once the wood flour is dried to the appropriate moisture content level for the second type of manufacturing process, care must also be taken to prevent the wood flour from reabsorbing additional moisture before it is extruded. Early attempts at manufacturing cellulosic/polymer composites failed because the wood flour was stored in humid manufacturing environments before it was extruded. Compounding systems for the second type of manufacturing process have since been employed to prevent the wood flour from absorbing undesired moisture. One such system utilizes a large dryer to pre-dry the wood flour and to maintain a dry storage environment for the wood flour.

Cost is an inherent drawback to using a large dryer to pre-dry the wood flour or to maintain a dry storage environment for the wood flour. For example, a drying/blending system for a large scale production facility can cost several million dollars. In addition, this type of compounding system requires bulky storage containers to hold the cellulosic/polymer composite materials, an elaborate piping and control system to transfer the cellulosic/polymer composite materials to various holding stations, and an independent mixing mechanism to combine the cellulosic/polymer composite materials. Consequently, such a compounding system is costly, susceptible to wear and tear, and time-consuming.

On the other hand, a compounding system which utilizes pre-dried wood flour that has been purchased from a remote commercial compounder also has shortcomings. The extra cost of dealing with a remote commercial compounder is not desirable, and the wood flour may have to be redried once it arrives at the extrusion facility prior to passing it through the extruder. This approach also has inherent drawbacks such as ordering, shipping, and material handling problems. Therefore, regardless of the compounding system which is employed, the second type of manufacturing process also possesses undesirable characteristics.

In light of the deficiencies of known manufacturing processes, a need exists for a manufacturing system that does not require an independent mixing mechanism to pelletize, cool, package, or store feed stock of the cellulosic/polymer composite materials. In addition, a need exists for a manufacturing system that utilizes a compounder instead of a twin-screw extruder to blend the cellulosic/polymer composite materials into a composite melt, and a need exists for a manufacturing system that does not require a costly, large dryer to pre-dry the wood flour or to maintain a dry storage environment for the wood flour. The present invention is designed to address these needs. The present invention is also designed to produce net shapes at higher rates, to streamline the manufacturing process, to create a manufacturing system that is less susceptible to wear and tear, to reduce the production costs of wood flour, to eliminate the drawbacks of independent drying, blending, and pelletizing systems, and to eliminate the problems caused by the shipping and material handling of wood flour.

In particular, the present invention continuously produces net shapes via an automated and continuous compounding plus finish extrusion system that does not require pre-dried wood flour or pelletized feed stock of the cellulosic/polymer composite materials. An exemplary embodiment of the present invention utilizes automated loss-in-weight feeders to dispense wood flour and all of the other cellulosic/polymer composite materials into a compounder. The compounder blends the cellulosic/polymer composite materials into a composite melt. The composite melt is continuously devolitalized as it travels through the compounder, a transition chute, and a finish extruder. The composite melt is then forced through a profile die which is fitted to the finish extruder in order to achieve a net shape.

The present invention, however, is not limited to the production of cellulosic/polymer composite shapes. The present invention may also be utilized to produce net shapes from material composites or formulations that do not include cellulosic materials. For instance, the present invention may produce net shapes from polyethylene (HDPE), polyvinyl chloride (PVC), and formulations that incorporate these materials. Moreover, the present invention may be used in conjunction with any material that may be adapted to be formed into a net extruded shape.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

Figure 1:
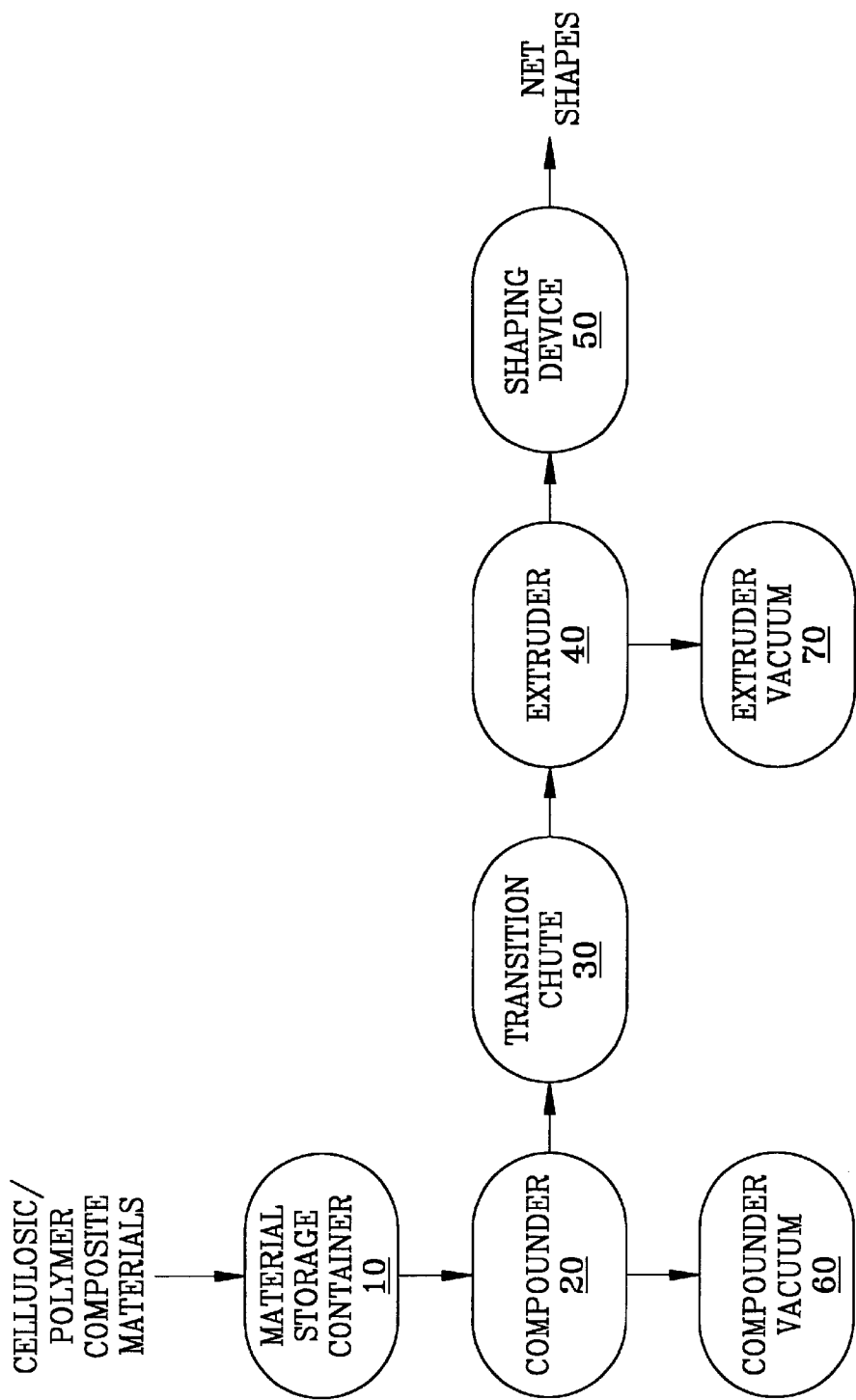
FIG. 1 is a block diagram illustrating the process of the present invention.

The present invention is directed to a continuous, in-line, compounding plus finish extrusion system that produces net shapes from materials that may be adapted to be formed into net shapes such as polyvinyl chloride (PVC) formulations, polyethylene (HDPE) formulations, and/or cellulosic/polymer composite materials. In performing this function, the unique compounding and extrusion system of the present invention eliminates the need to pre-dry the cellulosic material prior to feeding it to the compounder. In addition, it does not require an independent mixing mechanism to compound, pelletize, cool, package, or store feed stock of the cellulosic/polymer composite materials. By achieving these objectives, the in-line compounding and extrusion system of the present invention effectively overcomes the obstacles presented by the moisture sensitivity of cellulosic materials. Moreover, the present invention produces net shapes at a vastly higher rate than known systems. In fact, the present invention may produce net shapes at a rate exceeding 3,000 pounds per hour.

Due to the capabilities of the present invention, the composite may have a higher cellulosic content than previously used in the art. Moreover, the process of the present invention is not limited to the mixing of pure cellulosic/polymer composite materials. The present invention may produce net shapes from any material that may be adapted to be formed into a net shape, wherein such material may be comprised of one or more materials that may be adapted to be formed into a net shape. Accordingly, the cellulosic/polymer composite materials may include one or more raw materials including, but not limited to, cellulosic materials, thermoplastic materials, inorganic fillers, cross-linking agents, process lubricants, accelerators, inhibitors, enhancers, compatibilizers, blowing agents, and other similar materials.

The cellulosic materials utilized in one exemplary embodiment of the present invention may include any combination of sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, or any other similar materials. The thermoplastic materials may include multilayer films, polyethylene (HDPE), polypropylene, polyvinyl chloride (PVC), low density polyethylene (LDPE), CPVC ABS, ethyl-vinyl acetate, other similar polyethylene copolymers, other similar thermoplastic materials, or formulations that incorporate any of the aforementioned thermoplastic materials. Examples of inorganic fillers include talc, calcium carbonate, kaolin clay, magnesium oxide, titanium dioxide, silica, mica, barium sulfate, or any other similar materials. Commonly used cross-linking agents include polyurethanes, such as isocyanates, phenolic resins, unsaturated polyesters, and epoxy resins. Combinations of the aforementioned materials are also known examples of cross-linking agents. In addition, lubricants such as zinc stearate and wax are commonly used to aid the process.

Shown below is an example of a combination of cellulosic/polymer composite materials that may be extruded with the system of the present invention:

Wood Flour+Polyethylene (HDPE)+Wax

FIG. 1 illustrates the process of the in-line compounding and extrusion system. The process does not require pre-dried wood flour or pelletized feed stock of cellulosic/polymer composite materials. Instead, the cellulosic/polymer composite materials are stored as raw materials in at least one material storage container 10. Ideally, each cellulosic/polymer composite material is stored in a separate material storage container 10. It is well known in the art that loss-in-weight feeders may be utilized to store and provide the cellulosic/polymer composite materials.

Each material storage container 10 has at least one feeder to dispense its contents. After sufficient quantities of the cellulosic/polymer composite materials are loaded into at least one material storage container 10, a desired ratio of cellulosic/polymer composite materials is dispensed by the feeder or feeders, and a first aperture of a compounder 20 receives the desired ratio of cellulosic/polymer composite materials. Although this function may be manually performed, it is well known in the art that loss-in-weight feeders may be automated to continuously dispense the desired ratio of cellulosic/polymer composite materials to the compounder 20.

Figure 2:
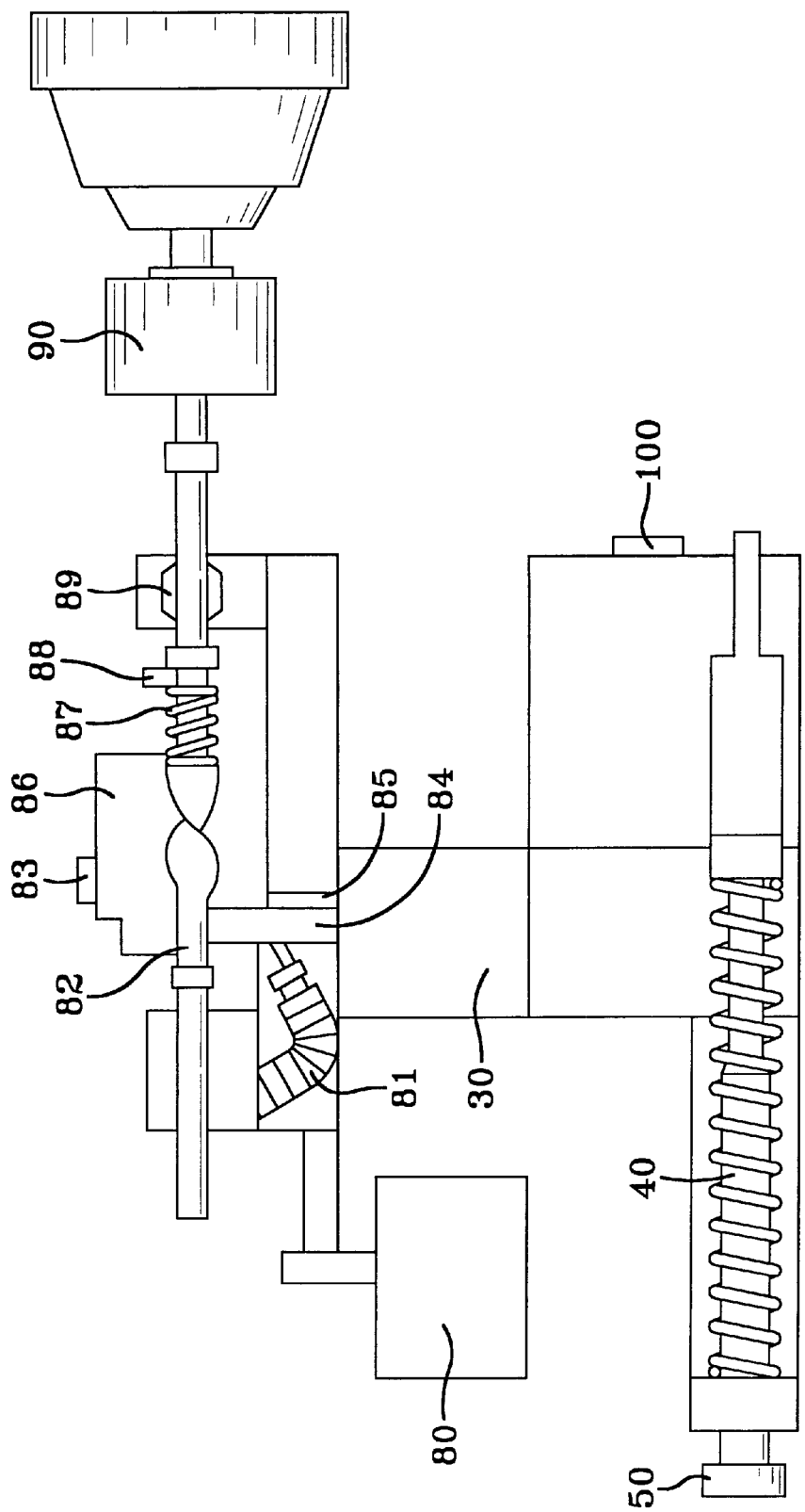
FIG. 2 is a diagram of a compounder plus finish extruder of an exemplary embodiment of the present invention.

The compounder 20 is utilized to blend the cellulosic/polymer composite materials into a composite melt. A CP Compact Compounder (CP1000) by the Farrel Corporation may be used for this purpose. FIG. 2 includes a diagram of a compounder 20. As shown in FIG. 2, a compounder 20 may include a touch view control screen 80, an electric motor actuator 81, visco seals 82, a vent 83, a melt temp thermocouple 84, a teflon-impregnated, electrically heated orifice 85, an electrically heated, segmented chamber barrel 86, a rotor with three-piece quick disconnect couplings 87, packing glands 88, grease packed bearings 89, and a unidrive gear reducer 90.

The compounder 20 continuously devolitalizes the composite melt. As the compounder 20 devolitalizes the composite melt, the composite melt travels through a second aperture of the compounder 20. A transition chute 30 is coupled to the compounder 20 for transferring the composite melt to a finish extruder 40. The transition chute 30 has a first end which receives the composite melt from the second aperture of the compounder 20. The composite melt continues to devolitalize as it travels through the transition chute 30. The composite melt then travels through a second end of the transition chute 30.

The compounder 20 and the transition chute 30 may be independent units which are coupled together. However, a CP Compact Compounder (CP1000) by the Farrel Corporation is equipped with a compounder 20 and a transition chute 30 which may perform the aforementioned functions. Regardless of the method of manufacture, the finish extruder 40 may be coupled to the transition chute 30 so that the finish extruder 40 receives the composite melt from the second end of the transition chute 30.

The composite melt continues to devolitalize as it travels through and is extruded by the finish extruder 40. The finish extruder 40 may be a single-screw extruder or a twin-screw extruder. For example, an embodiment of the present invention may use a twin-screw extruder (CM-80-Hp) by Cincinnati Milacron. At least one shaping device 50 is fitted to the finish extruder 40. Each shaping device 50 has at least one orifice through which the composite melt is forced in order to form the composite melt into a net shape. Profile dies and composite molders are examples of shaping devices 50 that are commonly used to perform this function. It is further known in the art that a plurality of such shaping devices 50 may be fitted to the finish extruder 40 in order to achieve a desired net shape.

In addition to the process described above, additional measures may be taken to achieve greater devolitalization of the composite melt. For instance, each feeder that dispenses cellulosic materials into the compounder 20 may be heated in order to dry the cellulosic materials as the cellulosic materials are dispensed into the compounder 20. In addition, the composite melt may be subjected to one or more vacuums while it travels through the compounder 20. In order to achieve this function, a compounder vacuum 60 is connected to a vent 83 of compounder 20. Similarly, the composite melt may be subjected to one or more vacuums while it is pumped through the finish extruder 40. This feature may be achieved, for example, by connecting an extruder vacuum 70 to a vent port 100 of finish extruder 40.

None of the measures described above to achieve greater devolitalization of the composite melt is exclusive of the others. If a cellulosic/polymer composite has a low cellulosic content, additional measures may not be required to devolitalize the composite melt. However, if the cellulosic/polymer composite has a high cellulosic content, several, if not all, of the additional measures may be employed in order to achieve adequate devolitalization of the composite melt.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A process for producing a net shape, said process comprising:

providing ingredients of a cellulosic/polymer composite material, said ingredients including a cellulosic material having a moisture content;

dispensing said ingredients into a first extrusion device independently of a step of pre-drying said cellulosic material immediately in advance of said dispensing step, said first extrusion device having a first extruder screw;

blending said ingredients into a composite melt in said first extrusion device such that said moisture content of said cellulosic material is reduced;

transferring said composite melt to a second extrusion device having a second extruder screw, said second extruder screw independent from said first extruder screw of said first extrusion device; and forcing said composite melt through a shaping device in association with said second extrusion device in order to form said net shape;

wherein said net shape is substantially free of damage that can be caused by an excessive moisture content of said cellulosic/polymer composite material.

2. The process of claim 1 further comprising the step of drying said cellulosic material as said cellulosic material is dispensed into said first extrusion device.

3. The process of claim 1 further comprising the step of subjecting said composite melt to a vacuum while said composite melt travels through said first extrusion device.

4. The process of claim 1 further comprising the step of subjecting said composite melt to a vacuum while said composite melt travels through said second extrusion device.

5. The process of claim 1 further comprising the steps of:

subjecting said composite melt to a vacuum while said composite melt travels through said first extrusion device; and subjecting said composite melt to a vacuum while said composite melt travels through said second extrusion device.

6. The process of claim 1 wherein a desired ratio of said ingredients of said cellulosic/polymer composite material is substantially continuously dispensed into said first extrusion device.

7. The process of claim 1 wherein said composite melt is transferred directly with uninterrupted flow from said first extrusion device to said second extrusion device.

8. The process of claim 1 wherein said first extrusion device is connected to said second extrusion device by a material transfer passage through which said composite melt is transferred.

9. The process of claim 1 wherein said first extrusion device is a compounder.

10. The process of claim 1 wherein said first extrusion device is a twin screw extruder.

11. The process of claim 1 wherein said second extrusion device is a twin screw extruder.

12. The process of claim 1 wherein said net shape is a final net shape.

13. The process of claim 1 wherein said net shape is produced at a rate of at least 3,000 pounds per hour.

14. A process for producing a net shape, said process comprising:

providing a cellulosic material having a moisture content;

dispensing said cellulosic material into a first extrusion device independently of a step of pre-drying said cellulosic material immediately in advance of said dispensing step, said first extrusion device having a first extruder screw;

blending said cellulosic material with a polymer in said first extrusion device to form a composite melt such that said moisture content of said cellulosic material is reduced;

transferring said composite melt to a second extrusion device having a second extruder screw, said second extruder screw independent from said first extruder screw of said first extrusion device; and forcing said composite melt through a shaping device in association with said second extrusion device in order to form a net shape;

wherein said net shape is substantially free of damage that can be caused by an excessive moisture content of said cellulosic material.

15. The process of claim 14 wherein said first extrusion device is a compounder.

16. The process of claim 14 wherein said first extrusion device is a twin screw extruder.

17. The process of claim 14 wherein said second extrusion device is a twin screw extruder.

18. A process for producing a net shape, said process comprising:

providing a cellulosic material having a moisture content;

dispensing said cellulosic material into a first extrusion device having a first extruder screw;

blending said cellulosic material with a polymer in said first extrusion device to form a composite melt such that said moisture content of said cellulosic material is reduced;

transferring said composite melt to a second extrusion device having a second extruder screw, said second extruder screw independent from said first extruder screw of said first extrusion device; and forcing said composite melt through a shaping device in association with said second extrusion device in order to form a net shape at a rate of at least 3,000 pounds per hour;

wherein said net shape is substantially free of damage that can be caused by an excessive moisture content of said cellulosic material.

19. The process of claim 18 wherein said dispensing step is performed independently of a step of pre-drying said cellulosic material immediately in advance of said dispensing step.

20. The process of claim 18 wherein said cellulosic material is substantially continually dispensed into said first extrusion device.

* * * * *

UNITED STATES PATENT AND TRADEMARK OFFICE
CERTIFICATE OF CORRECTION

PATENT NO. : 6,685,858 B2
DATED : February 3, 2004
INVENTOR(S) : Arthur F. Korney, Jr.

It is certified that error appears in the above-identified patent and that said Letters Patent is hereby corrected as shown below:

Title page,
Item [56], References Cited, U.S. PATENT DOCUMENTS, please insert the following references:

| | | | |
|---|---|---|---|
| -- 2001/0019749 | 4/2001 | Godavarti et al. | 428/34.2 |
| 2001/0051242 | 6/2001 | Godavarti et al. | 428/36.9 |
| 2001/0051243 | 6/2001 | Godavarti et al. | 428/36.9 |
| 2002/0015820 | 8/2001 | Puppin | 428/121 |
| 2002/0038684 | 10/2001 | Puppin | 156/88 |
| 2002/0092256 | 1/2002 | Hendrickson et al. | 52/519 -- |

FOREIGN PATENT DOCUMENTS, please insert the following references:

| | | |
|---|---|---|
| -- EP0269470 | 1/1988 | European Patent |
| EP0586211 | 3/1994 | European Patent |
| EP0586212 | 3/1994 | European Patent |
| EP0586213 | 3/1994 | European Patent |
| EP0747419 | 12/1996 | European Patent |
| FR2270311 | 2/1974 | French Patent |
| FR2365017 | 4/1978 | French Patent |
| FR2445885 | 8/1980 | French Patent |
| FR2564374 | 11/1985 | French Patent |
| GB1443194 | 7/1976 | GB Patent |
| GB2036148 | 6/1980 | GB Patent |
| GB2104903 | 3/1983 | GB Patent |
| GB2171953 | 9/1986 | GB Patent |
| GB2186655 | 8/1987 | GB Patent |
| DE2042176 | 4/1971 | German Patent |
| DE3801574 | 8/1989 | German Patent |
| DE4221070 | 12/1993 | German Patent |
| DE4033849 | 10/1990 | German Patent |
| WO 90/08020 | 7/1990 | WO -- |

OTHER DOCUMENTS, please insert the following references:

-- Bendtsen et al., Mechanical Properties of Wood, pages 4-2 to 4-44.
Bibliography of Solid Phase Extrusion, pages 187-195.
Brzoskowski et al., Air-Lubricated Die for Extrusion of Rubber Compounds, Rubber Chemistry and Technology, Vol. 60, page 945-956.
Collier et al., High Strength Extrudates by Melt Transformation Coextrusion, ANTEC, 1987, pages 497-502.
Collier et al., Streamlined Dies and Profile Extrusion, ANTEC, 1987, pages 203-206.
Company News, Plastics Industry News, May 1994, pages 70-71.
Dalväg et al., The Efficiency of Cellulosic Fillers in Common Thermoplastics. Part II. Filling with Processing Aids and Coupling Agents, 1985, vol. 11, pages 9-38.
Fiberloc Polymer Composites, B.F. Goodrich, Geon Vinyl Division, section 1, pages 2-15.
Fill Thermoplastics with Wood, Modern Plastics, May 1974, pages 54-55.
Fillers for Thermoplastics: Beyond Resin Stretching, Modern Plastics International, October 1976, pages 12-15.
From Sweden: Extruded Interior Trim Made of PVC and Wood Flour, Plastic Building Construction, vol. 9 no. 5, 1986, pages 5-6.
Henrici-Olive et al., Integral/Structural Ploymer Foams, Technology, Properties and Applications, Springer-Verlag, pages 111-122.
Klason et al., The Efficiency of Cellulosic Fillers in Common Thermoplastics. Part 1. Filling without Processing Aids or Coupling Agents, Polymeric Materials, 1984, vol. 10, pages 159-187.
Kokta et al., Composites of Poly(Vinyl Chloride) and Wood Fibers. Part II: Effect of Chemical Treatment, Polymer Composites, April 1990, pages 84-89.
Kokta et al., Composites of Polyvinyl Chloride-Wood Fibers. I. Effect of Isocyanate as a Bonding Agent, Polym.-Plast. Technol. Eng., 1990, 29(1&2), pages 87-118.
Kokta et al., Composites of Polyvinyl Chloride-Wood Fibers. III: Effect of Silane as Coupling Agent, Journal of Vinyl Technology, September 1990, pages 146-153.
Kokta et al., Use of Grafted Wood Fibers in Thermoplastic Composites v. Polystyrene, Centre de recherche en pâtes et papiers, Université du Québec à Trois-Rivières, Canada.
Kokta et al., Use of Wood Fibers in Thermoplastic Composites, Polymer Composites, October 1983, pages 229-232.
Maldas et al., Composites of Polyvinyl Chloride-Wood Fibers: IV. Effect of the Nature of Fibers, Journal of Vinyl Technology, June 1989, pages 90-98.
Maldas, et al., Improving Adhesion of Wood Fiber with Polystrene by the Chemical Treatment of Fiber with a Coupling Agent and the Influence on the Mechanical Properties of Composites, Journal of Adhesion Science Technology, vol. 3 no. 7, pages 529-539 (1989) --

UNITED STATES PATENT AND TRADEMARK OFFICE
CERTIFICATE OF CORRECTION

PATENT NO. : 6,685,858 B2
DATED : February 3, 2004
INVENTOR(S) : Arthur F. Korney, Jr.

It is certified that error appears in the above-identified patent and that said Letters Patent is hereby corrected as shown below:

OTHER DOCUMENTS, (Cont.) please insert the following references:

-- Myers et al., "Wood flour and polypropylene or high-density polyethylene composites: influence of maleated polypropylene concentration and extrusion temperature on properties", "Wood Fiber/Polymer Composites: Fundamental Concepts, Processes, and Material Options", pages 49-56.
Myers et al., Bibliography: Composites from Plastics and Wood-Based Fillers, USDA Forest Products Laboratory, Madison, WI, pages 1-27 odds (1991).
Myers et al., Effects of Composition and Polypropylene Melt Flow on Polypropylene-Waste Newspaper Composites, ANTEC, 1984, pages 602-604.
Pamphlet, Farrel Corporation, CB Compact Compounder.
Pamphlet, Kobelco Stewart Bolling, Inc., NEX-T Continuous Mixer/Extruder.
Pornmimit et al., Extrusion of Self-Reinforced Polyethylene, Advances in Polymer Technology, Vol. 11, No. 2, pages 92 - 98.
Raj et al., Use of Wood Fiber as Filler in Common Thermoplastics: Studies on Mechanical Properties, Science and Engineering of Composite Materials, vol. 1 no. 3, 1989, pages 85-98.
Raj et al., Use of Wood Fibers in Thermoplastics. VII. The Effect of Coupling Agents in Polyethylene-Wood Fiber Composites, Journal of Applied Polymer Science, vol. 37, pages 1089-1103 (1989).
Resin Stretching: Accent on Performance, Modern Plastic International, January 1974, pages 58-60.
Rogalski et al., Poly(Vinyl-Chloride) Wood Fiber Composites, ANTEC, 1987, pages 1436-1441.
Sonwood Outline, April, 1975.
Sonwood: a new PVC wood-flour alloy for Extrusions and other Plastic Processing Techniques, Sonesson Plast AB, Malmo, Sweden.
Thomas et al., Wood Fibers for Reinforcing Fillers for Polyolefins, ANTEC, 1984, pages 687-689.
Wood Filled PVC, Plastics Industry News, July 1996, page 6.
Woodhams et al., Wood Fibers for Reinforcing Fillers for Polyolefins, Polymer Engineering and Science, October 1984, pages 1166-1171.
Yam et al., Composites from Compounding Wood Fibers With Recycled High Density Polyethylene, Polymer Engineering and Science, mid-June 1990, pages 693-699, Vol. 30, No. 11.
Yuskova, et al., Interaction of Components in Poly(Vinyl Choloride) Filled in Polymetization, Makroniol Chem., Macromol. Symp. 29, 315-320 (1989).
Zadorecki et al., Future Prospects for Wood Cellulose as Reinforcement In Organic Polymer Composites, Polymer Composites, April 1989, pages 69-77. --

Signed and Sealed this

Twenty-seventh Day of April, 2004

JON W. DUDAS
*Acting Director of the United States Patent and Trademark Office*